(12) United States Patent
Kobayashi et al.

(10) Patent No.: US 12,450,687 B2
(45) Date of Patent: Oct. 21, 2025

(54) MEDICAL IMAGE PROCESSING APPARATUS, MAMMOGRAPHY APPARATUS, AND METHOD

(71) Applicant: CANON MEDICAL SYSTEMS CORPORATION, Tochigi (JP)

(72) Inventors: Yoshimasa Kobayashi, Nasushiobara (JP); Takahiro Inagaki, Nasushiobara (JP)

(73) Assignee: CANON MEDICAL SYSTEMS CORPORATION, Tochigi (JP)

( * ) Notice: Subject to any disclaimer, the term of this patent is extended or adjusted under 35 U.S.C. 154(b) by 619 days.

(21) Appl. No.: 17/457,046

(22) Filed: Dec. 1, 2021

(65) Prior Publication Data
US 2022/0172320 A1 Jun. 2, 2022

(30) Foreign Application Priority Data
Dec. 1, 2020 (JP) .................. 2020-199393

(51) Int. Cl.
*G06T 3/20* (2006.01)
*A61B 6/02* (2006.01)
(Continued)

(52) U.S. Cl.
CPC ............. *G06T 3/20* (2013.01); *A61B 6/025* (2013.01); *A61B 6/0435* (2013.01); *A61B 6/502* (2013.01);
(Continued)

(58) Field of Classification Search
CPC ....... A61B 6/025; A61B 6/0435; A61B 6/463; A61B 6/468; A61B 6/502; G06T 2207/10072; G06T 2207/30068; G06T 3/20; G06T 7/0014; G06T 7/30; G06T 7/68; G06T 7/70; G06T 7/74
(Continued)

(56) References Cited

U.S. PATENT DOCUMENTS 10,092,264 B2 * 10/2018 Machida ................ A61B 6/466
2005/0201608 A1 * 9/2005 Umeki .................... G06T 3/147
382/132

(Continued)

FOREIGN PATENT DOCUMENTS

JP 2002-65613 A 3/2002
JP 2006149944 A * 6/2006
(Continued)

OTHER PUBLICATIONS

Japanese Office Action issued May 22, 2024 in Japanese Application 2020-199393, 5 pages.

*Primary Examiner* — Chineyere Wills-Burns
*Assistant Examiner* — Emmanuel Silva-Avina
(74) *Attorney, Agent, or Firm* — Oblon, McClelland, Maier &Neustadt, L.L.P.

(57) ABSTRACT

A medical image processing apparatus according to an embodiment includes processing circuitry. The processing circuitry is configured to change the position of a breast rendered in a first medical image. On the basis of the post-change position of the breast, the processing circuitry is configured to correct the position of the breast rendered in a second medical image in which the positional arrangement state of the breast is the same as that in the first medical image.

12 Claims, 5 Drawing Sheets

(51) Int. Cl.
*A61B 6/04* (2006.01)
*A61B 6/50* (2024.01)
*G06T 7/00* (2017.01)
*G06T 7/30* (2017.01)
*G06T 7/68* (2017.01)
*G06T 7/70* (2017.01)

(52) U.S. Cl.
CPC .............. *G06T 7/0014* (2013.01); *G06T 7/30* (2017.01); *G06T 7/68* (2017.01); *G06T 7/70* (2017.01); *G06T 2207/10072* (2013.01); *G06T 2207/30068* (2013.01)

(58) Field of Classification Search
USPC ......................................................... 382/131
See application file for complete search history.

(56) References Cited

U.S. PATENT DOCUMENTS

| | | | | |
|---|---|---|---|---|
| 2007/0242800 | A1* | 10/2007 | Jing | A61B 6/4429 382/131 |
| 2009/0016580 | A1* | 1/2009 | Yamamichi | A61B 6/502 382/128 |
| 2009/0268864 | A1* | 10/2009 | Nishida | A61B 6/563 378/98.12 |
| 2017/0055929 | A1 | 3/2017 | Machida et al. | |
| 2018/0322633 | A1 | 11/2018 | Kuratomi et al. | |
| 2021/0228170 | A1 | 7/2021 | Fukuda | |

FOREIGN PATENT DOCUMENTS

| | | | |
|---|---|---|---|
| JP | 2017-42422 | A | 3/2017 |
| JP | 6146249 | B2 * | 6/2017 |
| JP | 2018-187042 | A | 11/2018 |
| WO | WO 2020/080082 | A1 | 4/2020 |

* cited by examiner

MEDICAL IMAGE PROCESSING APPARATUS, MAMMOGRAPHY APPARATUS, AND METHOD

CROSS-REFERENCE TO RELATED APPLICATIONS

This application is based upon and claims the benefit of priority from Japanese Patent Application No. 2020-199393, filed on Dec. 1, 2020; the entire contents of which are incorporated herein by reference.

FIELD

Embodiments described herein relate generally to a medical image processing apparatus, a mammography apparatus, and a method.

BACKGROUND

In some medical examinations using a mammography apparatus, two-dimensional imaging and tomosynthesis imaging may be sequentially performed on an examined subject (the breasts) being positioned. The two-dimensional imaging and the tomosynthesis imaging are performed on each of the left and the right breasts. With respect to X-ray images (two-dimensional images) from the two-dimensional imaging and X-ray images (tomosynthesis images) from the tomosynthesis imaging, the mammography apparatus is configured to cause a display to display the left and the right breasts in symmetry (e.g., back to back), so as to facilitate comparison image interpretation between the left and the right breasts.

However, when the breast placement positions on a placement table are different between when the left breast is imaged and when the right breast is imaged, it is impossible to display the breasts in bilateral symmetry. When the two-dimensional imaging and the tomosynthesis imaging are sequentially performed, it is cumbersome for an operator such as a radiologist or an image interpreting doctor, because it is necessary to correct the positional misalignment between the left and the right breasts, in both the two-dimensional images and the tomosynthesis images.

DETAILED DESCRIPTION

Figure 1:
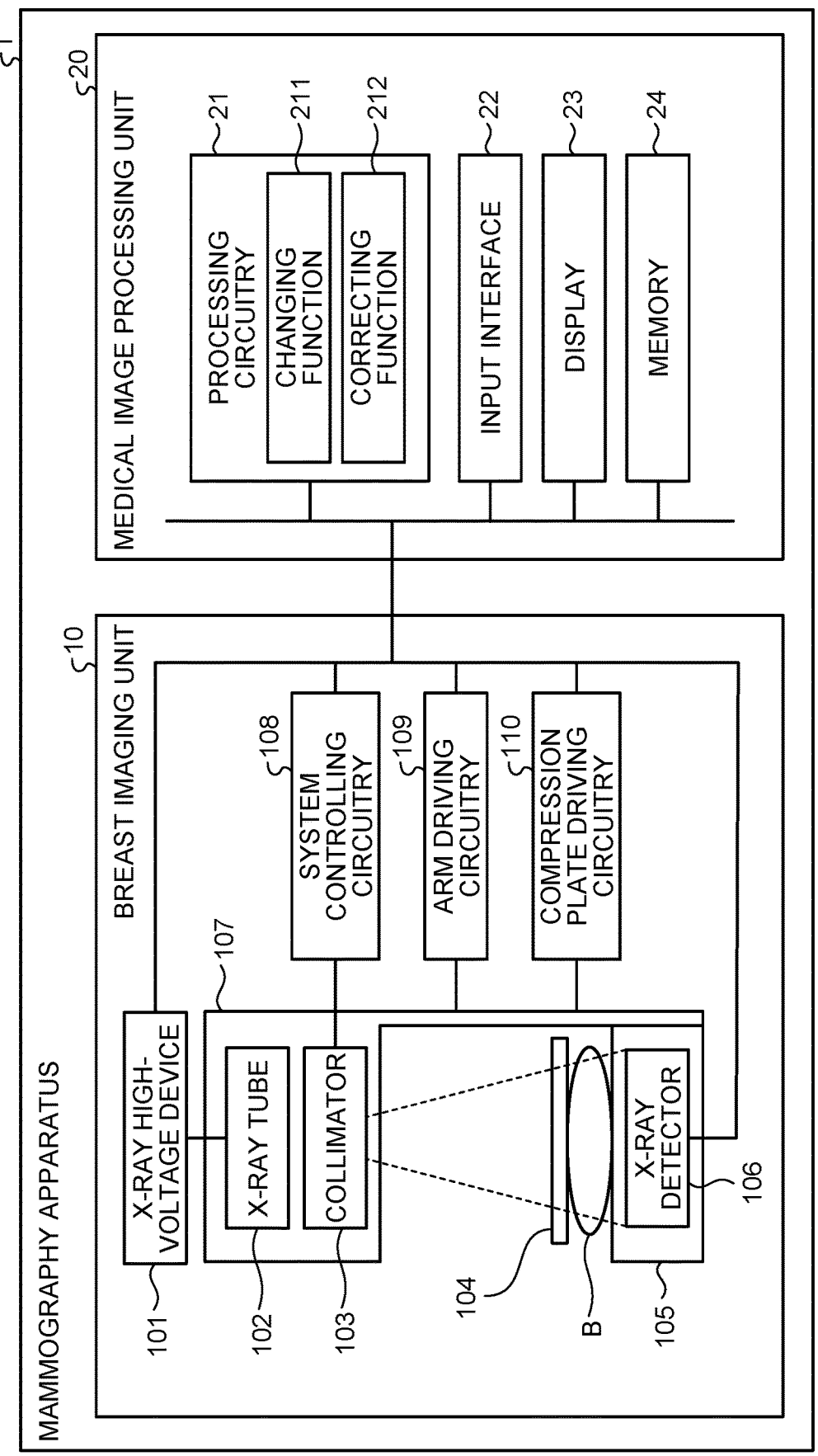
FIG. 1 is a block diagram illustrating a configuration of a mammography apparatus according to a first embodiment.

According to an embodiment, a medical image processing apparatus includes processing circuitry. The processing circuitry is configured to change the position of a breast rendered in a first medical image. On the basis of the post-change position of the breast, the processing circuitry is configured to correct the position of the breast rendered in a second medical image in which the positional arrangement state of the breast is the same as that in the first medical image.

Exemplary embodiments will be explained below, with reference to the accompanying drawings. Possible embodiments of the medical image processing apparatus, the mammography apparatus, and the method are not limited to the embodiments described below. Further, in the following explanations, some of the constituent elements that are the same as each other will be referred to by using the same reference characters, and duplicate explanations thereof will be omitted.

First Embodiment

FIG. 1 is a block diagram illustrating an exemplary configuration of a mammography apparatus 1 according to a first embodiment. As illustrated in FIG. 1, the mammography apparatus 1 includes a breast imaging unit 10 and a medical image processing unit 20.

The breast imaging unit 10 is configured to perform X-ray imaging, while compressing a breast B that has been positioned by an operator such as a radiologist. The breast imaging unit 10 is configured to perform the X-ray imaging on each of the left and the right breasts. In this situation, the X-ray imaging includes two-dimensional imaging (mammography imaging) and tomosynthesis imaging. The breast imaging unit 10 is configured to sequentially perform the two-dimensional imaging and the tomosynthesis imaging while the positional arrangement state of the breast is maintained. The two-dimensional imaging is an imaging process by which a planar image is obtained by emitting X-rays onto the breast from one direction. The tomosynthesis imaging is an image process by which a three-dimensional image is obtained by sequentially emitting X-rays onto the breast from multiple directions. Examples of X-ray imaging directions performed on the breast include a Cranio-Caudal (CC) projection direction and a Medio-Lateral Oblique (MLO) projection direction.

The medical image processing unit 20 is configured to display X-ray images (two-dimensional images) based on the two-dimensional imaging (the mammography imaging) and X-ray images (tomosynthesis images) based on the tomosynthesis imaging performed by the breast imaging unit 10. The two-dimensional images and the tomosynthesis images are the breast images obtained from the mutually-different types of imaging processes. The medical image processing unit 20 is configured to display the two-dimensional image and the tomosynthesis image corresponding to each of the left and the right breasts.

The breast imaging unit 10 includes an X-ray high-voltage device 101, an X-ray tube 102, a collimator 103, a compression plate 104, a placement table 105, an X-ray detector 106, an arm 107, system controlling circuitry 108, arm driving circuitry 109, and compression plate driving circuitry 110.

The X-ray high-voltage device 101 is configured to generate high voltage in accordance with control of the system controlling circuitry 108 and to apply the generated high voltage to the X-ray tube 102. The X-ray tube 102 is configured to emit the X-rays onto the breast B placed on the placement table 105, on the basis of the high voltage applied by the X-ray high-voltage device 101. The collimator 103 includes, for example, (a total of four) limiting blades that are provided as one pair at the top and the bottom and another pair on the left and the right. The limiting blades are each formed to have a flat shape by using a material that can shield X-rays such as lead. The collimator 103 is configured to open and close the limiting blades in accordance with control of the system controlling circuitry 108 and to form a range (an irradiated field) irradiated by the X-rays emitted from the X-ray tube 102.

For example, the compression plate 104 is a transparent or translucent plate formed by using a material that can pass the X-rays such as resin and is configured to compress the breast B placed on the placement table 105. The compression plate 104 is movably supported by the arm 107 and is moved in the directions toward and away from the placement table 105. The placement table 105 is a table on which the breast B is placed and is supported by the arm 107. The placement table 105 is provided in a position opposite the X-ray tube 102 and includes the X-ray detector 106 on the inside thereof.

For example, the X-ray detector 106 is configured by using a Flat Panel Detector (FPD) or the like. The X-ray detector 106 is configured to detect X-rays that were emitted from the X-ray tube 102 and have passed through the breast B. The X-ray detector 106 is configured to supply the medical image processing unit 20 with a detection signal corresponding to the detected X-rays.

For example, the arm 107 includes an X-ray tube supporting mechanism and a placement table supporting mechanism, which are provided so as to be independently movable by the arm driving circuitry 109. The X-ray tube supporting mechanism is configured to support the X-ray tube 102 and the collimator 103. The placement table supporting mechanism is configured to support the compression plate 104 and the placement table 105.

The system controlling circuitry 108 is configured by using a processor, for example. The system controlling circuitry 108 is configured to receive a control signal supplied from the medical image processing unit 20 and to control the X-ray high-voltage device 101, the X-ray tube 102, the collimator 103, the placement table 105, the X-ray detector 106, the arm 107, the arm driving circuitry 109, and the compression plate driving circuitry 110, on the basis of the control signal.

The arm driving circuitry 109 is configured by using a motor and an actuator, or the like, for example. The arm driving circuitry 109 is configured to drive the arm 107, under control of the system controlling circuitry 108. The position of the X-ray imaging (the two-dimensional imaging and the tomosynthesis imaging) performed on the breast B changes, as the arm 107 is driven. The compression plate driving circuitry 110 is configured by using a motor and an actuator, or the like, for example. The compression plate driving circuitry 110 is configured to drive the compression plate 104, under control of the system controlling circuitry 108. As the compression plate 104 is driven, the breast B placed on the placement table 105 is compressed.

Further, the medical image processing unit 20 includes processing circuitry 21, an input interface 22, a display 23, and a memory 24.

The processing circuitry 21 is configured by using a processor, for example. The processing circuitry 21 is configured to control the entirety of the mammography apparatus 1, by controlling functional units of the medical image processing unit 20 and the system controlling circuitry 108 included in the breast imaging unit 10. Further, the processing circuitry 21 functions as a changing function 211 and a correcting function 212 as a result of reading and executing programs stored in the memory 24. The changing function 211 is an example of the changing means. The correcting function 212 is an example of a correcting means.

The processing circuitry 21 is configured to supply the system controlling circuitry 108 with the control signal so as to cause the breast imaging unit 10 to perform the X-ray imaging. Further, the processing circuitry 21 is configured to cause the display 23 to display the X-ray images. Further, the processing circuitry 21 is configured to receive, from the breast imaging unit 10, the detection signal corresponding to the X-rays detected by the X-ray detector 106 included in the breast imaging unit 10 and to further generate the X-ray images (the two-dimensional images and the tomosynthesis images).

The processing circuitry 21 is configured to perform an image processing process on the detection signal supplied from the X-ray detector 106 and to store X-ray images resulting from the image processing process into the memory 24. For example, the processing circuitry 21 is configured to perform various types of processes such as a frequency processing process, a dynamic range compressing process, a gradation processing process, and/or the like. Further, the processing circuitry 21 is configured to generate a plurality of tomographic images by performing an image reconstruction process using a method such as Filtered Back Projection (FBP) or OS-EM on a plurality of projection images obtained by performing the tomosynthesis imaging.

The input interface 22 is configured by using an input device that receives various types of input operations from the operator. The input interface 22 is configured to receive the input operations from the operator and to supply electrical signals corresponding to the received input operations to the processing circuitry 21. For example, the input interface 22 is configured by using a mouse, a keyboard, a trackball, various types of buttons such as a radiation emission switch, a touchpad on which input operations can be performed by touching an operation surface thereof, a touch screen in which a display screen and a touchpad are integrally formed, a contactless input circuit using an optical sensor, an audio input circuit, and/or the like.

The display 23 is configured by using a display apparatus that displays various types of information. For example, under control of the processing circuitry 21, the display 23 is configured to display a Graphical User Interface (GUI), X-ray images, information appended to the X-ray images, and the like.

For example, the memory 24 is configured by using a semiconductor memory element such as a Random Access Memory (RAM) or a flash memory, or a hard disk, an optical disk, or the like and is configured to store therein various types of information, various types of data, and various types of programs. For example, the memory 24 is configured to store therein a Graphical User Interface (GUI), X-ray images, information related to the X-ray images, and the like. Further, the memory 24 is configured to store therein the programs that are executed by the processing circuitry 21 and that cause the processing circuitry 21 to function as the changing function 211 and the correcting function 212.

In the mammography apparatus 1 structured as described above, the medical image processing unit 20 is configured to cause the display 23 to display the X-ray images (the two-dimensional images) based on the two-dimensional imaging and the X-ray images (the tomosynthesis images) based on the tomosynthesis imaging performed by the breast imaging unit 10. The two-dimensional images and the tomosynthesis images are the breast images obtained by performing the mutually-different types of imaging processes (the two-dimensional imaging and the tomosynthesis imaging).

In this situation, during the mammography examination, the X-ray imaging process is performed on each of the left and the right breasts, one at a time. Accordingly, in some situations, the breast placement positions on the placement table may be different between when the left breast is imaged and when the right breast is imaged. In those situations, when the X-ray images are displayed on a display without any adjustment, the positions of the left and the right breasts rendered in the X-ray images would not be bilaterally symmetrical, which would make it difficult to perform comparison image interpretation. In those situations, the operator would be required to perform an operation to correct the misalignment between the left and the right breasts, so as to display the left and the right breasts in symmetry. Further, because the two-dimensional imaging and the tomosynthesis imaging are sequentially performed, when the breast placement positions on the placement table are different between when the left breast is imaged and when the right breast is imaged, it would be difficult to perform comparison image interpretation on the two-dimensional images and on the tomosynthesis images both.

The medical image processing unit 20 is configured to facilitate the comparison image interpretation between the left and the right breasts, by aligning the position of the left breast with the position of the right breast, with respect to the two-dimensional image and the tomosynthesis image acquired of each of the left and the right breasts. In other words, the medical image processing unit 20 is configured to perform the process of correcting the two-dimensional images and the tomosynthesis images so that the positions of the left and the right breasts are bilaterally symmetrical.

The following will describe processes performed by the mammography apparatus 1 configured as described above.

The breast imaging unit 10 is configured to perform the X-ray imaging by compressing the breast B positioned by the operator such as a radiologist. More specifically, the X-ray imaging is performed while one of the left and the right breasts B is placed on the placement table 105 and compressed by the compression plate 104. In the present example, during the X-ray imaging, the two-dimensional imaging and the tomosynthesis imaging are sequentially performed, while the breast B is compressed by the compression plate 104 (while the positional arrangement state of the breast B is maintained).

For example, the breast imaging unit 10 performs the two-dimensional imaging on the left breast B in a direction CC. The arm driving circuitry 109 positions the arm 107, so that the angle formed by the arm 107 is equal to 0 degrees (the direction CC). In accordance with an operation (an operation to turn on the radiation emission switch) performed by the operator via the input interface 22, the X-ray tube 102 emits the X-rays, so that the X-ray detector 106 detects X-rays that were emitted from the X-ray tube 102 and have passed through the breast B. The processing circuitry 21 performs the image processing process on the detection signal supplied by the X-ray detector 106. As a result, the medical image processing unit 20 has obtained a two-dimensional image of the left breast B in the direction CC.

After having performed the two-dimensional imaging on the left breast B in the direction CC, the breast imaging unit 10 performs the tomosynthesis imaging on the left breast B in the direction CC. The arm driving circuitry 109 positions the arm 107 so that the angle formed by the arm 107 corresponds to a start position (e.g., −7.5 degrees) of the tomosynthesis imaging. Further, the arm driving circuitry 109 moves the arm 107 at a predetermined speed from the start position to an end position (e.g., +7.5 degrees) of the tomosynthesis imaging and stops the arm 107 at the end position of the tomosynthesis imaging.

Further, while the arm 107 is moving from the start position to the end position of the tomosynthesis imaging, the X-ray tube 102 emits the X-rays at predetermined intervals such as twice per second, for example. Every time X-rays that were emitted from the X-ray tube 102 and have passed through the breast B are detected, the X-ray detector 106 supplies the medical image processing unit 20 with a detection signal corresponding to the detected X-rays. The processing circuitry 21 performs the image processing process on the detection signal supplied by the X-ray detector 106. For example, when the X-rays are emitted fifteen times during the tomosynthesis imaging, the processing circuitry 21 acquires fifteen projection images respectively corresponding to the X-ray emissions and further performs the reconstruction process by using a method such as FBP or OS-EM on the basis of the projection images, so as to obtain the plurality of tomographic images. As a result, the medical image processing unit 20 has obtained a tomosynthesis image (the plurality of tomographic images) of the left breast B in the direction CC. In this manner, the two-dimensional imaging and the tomosynthesis imaging have sequentially been performed on one of the breasts B (the left breast B in the present example), while the positional arrangement state of the breast B is maintained.

After the two-dimensional imaging and the tomosynthesis imaging have been performed on the one of the breasts B, the same imaging processes are also performed on the other breast B. In other words, after the two-dimensional imaging and the tomosynthesis imaging on the left breast B in the direction CC are performed, the two-dimensional imaging and the tomosynthesis imaging on the right breast B in the direction CC are performed. After that, the processing circuitry 21 stores the two-dimensional images and the tomosynthesis images acquired of the left and the right breasts B, into the memory 24.

Further, to the two-dimensional images and the tomosynthesis images (the plurality of tomographic images) of the left and the right breasts B, the processing circuitry 21 appends positional arrangement identification information identifying that the images were taken in mutually the same positional arrangement state. For example, to the two-dimensional image rendering the left breast B, positional arrangement identification information identifying the tomosynthesis image rendering the left breast B is appended. The same applies to the two-dimensional image rendering the right breast B and to the tomosynthesis images corresponding to the left and the right breasts. Thus, the images each have appended thereto the positional arrangement identification information identifying that the images were taken in mutually the same positional arrangement state. The processing circuitry 21 causes the positional arrangement identification information to be contained in a standard tag or a private tag based on a Digital Imaging and Communications in Medicine (DICOM) scheme, for example. The two-dimensional images and the tomosynthesis images taken in mutually the same positional arrangement state are kept in correspondence with each other by the positional arrangement identification information.

Further, to the two-dimensional images and the tomosynthesis images (the plurality of tomographic images) of the left and the right breasts B, the processing circuitry 21 appends pair image identification information identifying that the images form left-and-right pairs. For example, to the two-dimensional image rendering the left breast B, pair image identification information identifying the two-dimensional image rendering the right breast B and forming therewith a left-and-right pair is appended. The same applies to the two-dimensional image rendering the right breast B and to the tomosynthesis images corresponding to the left and the right breasts. Thus, the images each have appended thereto the pair image identification information identifying that the images form the left-and-right pairs with each other. The processing circuitry 21 causes the appended information to be contained in a standard tag or a private tag based on the DICOM scheme, for example. The images forming the left-and-right pairs are kept in correspondence with each other by the pair image identification information.

Figure 2:
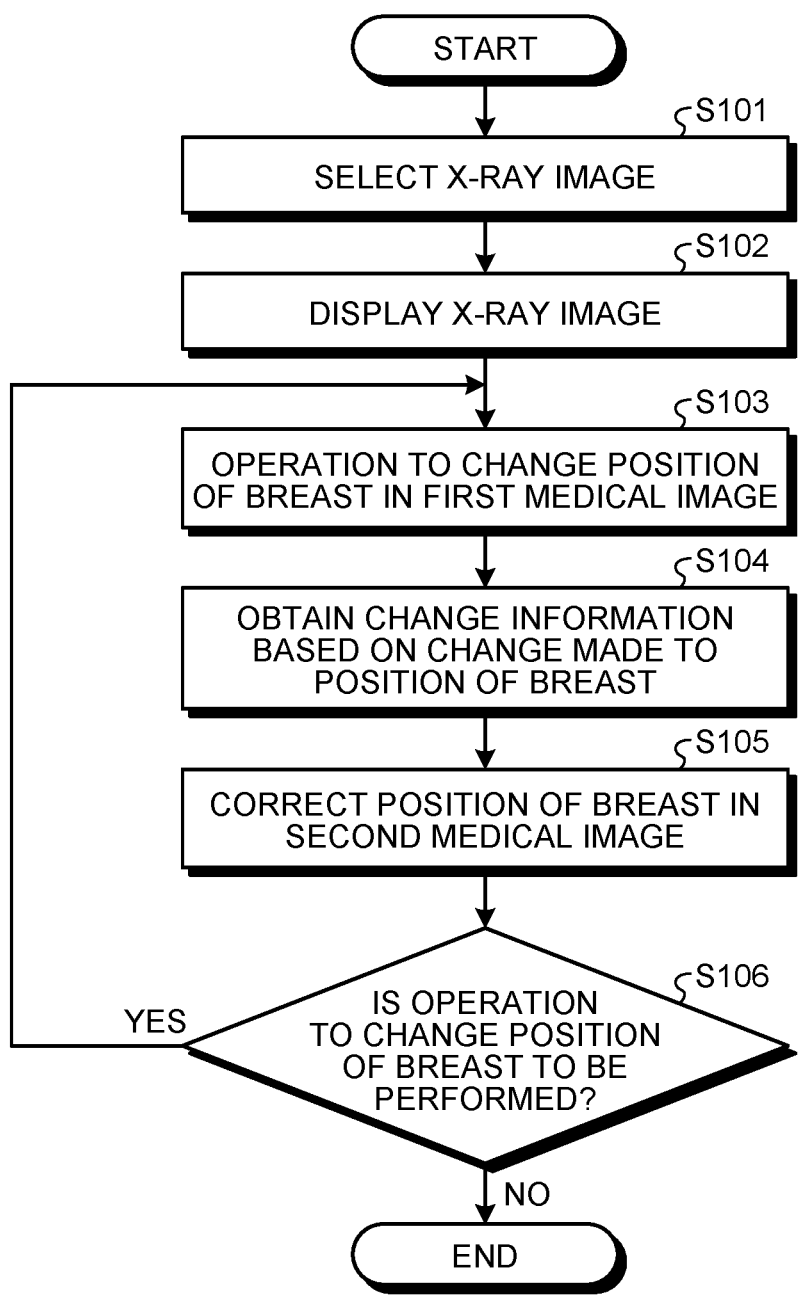
FIG. 2 is a flowchart indicating a process performed by the mammography apparatus illustrated in FIG. 1.

As illustrated in FIG. 2, the processing circuitry 21 selects an X-ray image to be read from the memory 24, in accordance with an operation of the operator received via the input interface 22 (step S101). The processing circuitry 21 causes the display 23 to display the selected X-ray image (step S102). When the two-dimensional image rendering the left breast B is selected, the processing circuitry 21 causes the display 23 to display the tomosynthesis image rendering the left breast B and being kept in correspondence with the two-dimensional image, as well as the two-dimensional image and the tomosynthesis image rendering the right breast B forming a left-and-right pair with the left breast B, on the basis of the positional arrangement identification information and the pair image identification information appended to the two-dimensional image.

Figure 3:
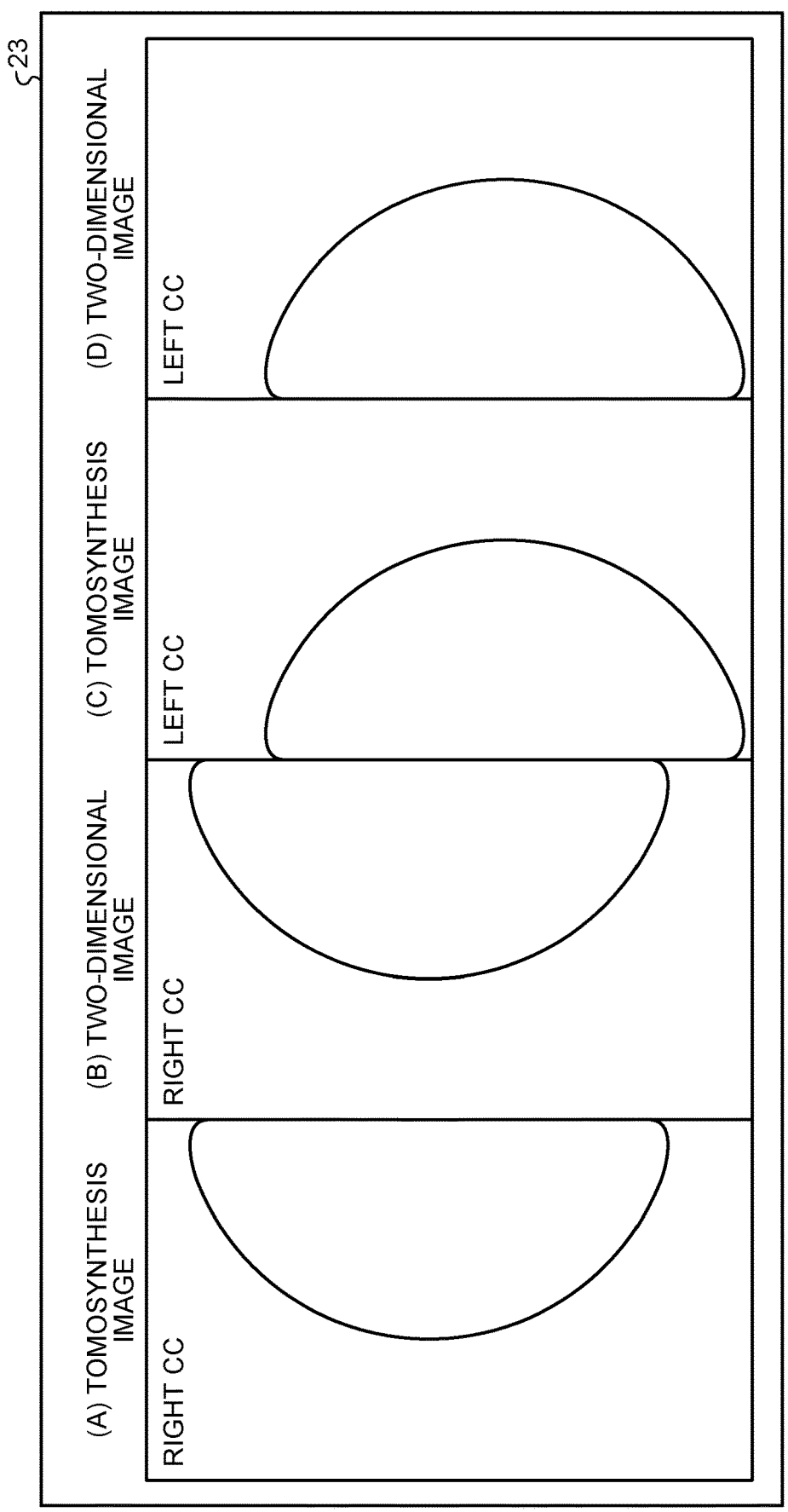
FIG. 3 is a drawing illustrating examples of X-ray images displayed by the mammography apparatus illustrated in FIG. 1.

For example, as illustrated in FIG. 3, the processing circuitry 21 causes the display 23 to display the two-dimensional images and the tomosynthesis images rendering the left and the right breasts B. In this situation, when the placement positions of the breasts B on the placement table 105 are different between when the left breast B is imaged and when the right breast B is imaged, the left and the right breasts B are displayed while the positions thereof are not bilaterally symmetrical.

The changing function 211 included in the processing circuitry 21 changes the position of the breast B in one (a first medical image) of the four X-ray images displayed on the display 23. In this situation, the input interface 22 receives an operation to change the position of the breast B (step S103). The operator views the left and the right breasts B displayed on the display 23 and performs the operation to move the breast B so that the left and the right breasts B become bilaterally symmetrical. For example, as illustrated in the left section of FIG. 4, the operation is performed to align the position of the left breast B rendered in the two-dimensional image (the first medical image) with the position of the right breast B. In accordance with the operation performed by the operator, the changing function 211 changes the position of the breast B rendered in the first medical image.

The correcting function 212 included in the processing circuitry 21 obtains change information based on the change made to the position of the breast B (step S104). More specifically, when the operation is performed to translate the left breast B rendered in the two-dimensional image upward by 8 mm, the correcting function 212 obtains the change information indicating the change direction "upward" and the change amount "8 mm".

On the basis of the obtained change information, the correcting function 212 corrects the position of the breast B in the tomosynthesis image (a second medical image) kept in correspondence with the two-dimensional image (step S105). More specifically, on the basis of the positional arrangement identification information appended to the two-dimensional image in which the position of the breast B has been changed, the correcting function 212 identifies the tomosynthesis image (the second medical image) kept in correspondence with the two-dimensional image. As illustrated in the right section of FIG. 4, the correcting function 212 corrects the position of the left breast B in the plurality of tomographic images structuring the identified tomosynthesis image, on the basis of the change information (the change direction "upward" and the change amount "8 mm") obtained at step S104. In this manner, on the basis of the position of the breast B changed by the changing function 211, the correcting function 212 corrects the position of the breast B rendered in the tomosynthesis image (the second medical image).

After that, the changing function 211 judges whether or not an operation to change the position of the breast B is to be performed on any one of the four X-ray images (the first medical images) displayed on the display 23 (step S106). When an operation to change the position of the breast B is performed within a certain period of time (step S106: Yes, S103), the changing function 211 and the correcting function 212 perform the same processes as described above. On the contrary, when no operation to change the position of the breast B is performed within the certain period of times (step S106: No), the changing function 211 stores, into the memory 24, the first medical image in which the position of the breast B has been changed (the two-dimensional image rendering the left breast B in the present example), the second medical image (the tomosynthesis image rendering the left breast B in the present example), and the change information obtained at step S104, together with the pre-change X-ray images, and thus ends the series of processes (END).

As explained above, according to the first embodiment, among the two-dimensional images and the tomosynthesis images rendering the breast taken in mutually the same positional arrangement state, the changing function 211 is configured to change the position of the breast B rendered in the first medical image (e.g., the two-dimensional image). The correcting function 212 is configured to correct the position of the breast B rendered in the second medical image (e.g., the tomosynthesis image) on the basis of the position of the breast B changed by the changing function 211. As a result, by changing the position of the breasts B in one of the two-dimensional and the tomosynthesis images taken in mutually the same positional arrangement state, it is possible to change the position of the breast B in the other image. Consequently, it is possible to easily correct the position of the breast B rendered in the medical image used in comparison.

Further, according to the first embodiment, the correcting function 212 is configured to obtain the change information based on the change made to the position of the breast and to further correct the position of the breast rendered in the second medical image on the basis of the change information. Accordingly, it is possible to easily correct the position of the breast rendered in the medical image used in comparison.

Further, according to the first embodiment, the changing function 211 is configured to change the position of the breast rendered in the first medical image in accordance with the operation performed by the operator. Accordingly, the operator is able to change the position of the breast to a desired position.

Further, according to the first embodiment, one or both of the first and the second medical images has appended thereto the positional arrangement identification information identifying the images taken of the breast in mutually the same positional arrangement state. The correcting function 215 is configured to identify the second medical image in which the positional arrangement state of the breast is the same as that in the first medical image on the basis of the positional arrangement identification information and to further correct the position of the breast rendered in the second medical image. As a result, it is possible to appropriately correct the positions of the breast rendered in the two-dimensional image and the tomosynthesis image obtained by performing the mutually-different types of imaging processes.

Further, although the example was explained in the first embodiment in which the direction CC is used as the direction of the X-ray imaging performed on the breast B, the imaging direction may be an MLO direction or any other direction. Two-dimensional imaging and tomosynthesis imaging may sequentially be performed in various imaging directions.

Further, although the example was explained in the first embodiment in which the position of the breast B is changed in the two-dimensional image, it is also acceptable to change the position of the breast B in the tomosynthesis image. In other words, in that situation, the tomosynthesis image serves as the first medical image, whereas the two-dimensional image serves as the second medical image. In this situation also, similarly to the first embodiment, the changing function 211 is configured to change the position of the breast B in the tomosynthesis image (the first medical image). The correcting function 212 is configured to correct the position of the breast B rendered in the two-dimensional image (the second medical image) on the basis of the position of the breast B changed by the changing function 211.

Furthermore, although the example was explained in the first embodiment in which the display 23 is configured to display the two-dimensional images and the tomosynthesis images (the four X-ray images) rendering the left and the right breasts B, the display 23 may be configured to display both (the two X-ray images) or one (one of the X-ray images) of the two-dimensional and the tomosynthesis images rendering one of the breasts B. For example, when only the medical image (the first medical image) rendering the left breast B is displayed on the display 23, the changing function 211 may change the position of the left breast B rendered in the two-dimensional image (the first medical image), so that the correcting function 212 corrects the position of the left breast B in the tomosynthesis image (the second medical image) kept in correspondence with the two-dimensional image and stored in the memory 24, without having the tomosynthesis image displayed on the display 23.

Further, although the example was explained in the first embodiment in which the tomosynthesis images displayed on the display 23 are the tomographic images, the tomosynthesis images may be one selected from among: projection images, tomographic images, and a synthetic two-dimensional image obtained by synthesizing the tomographic images. The synthetic two-dimensional image is a single synthetic image obtained by performing a projecting process such as Minimum Intensity Projection (MinIP) on the plurality of tomographic images and may be generated by the processing circuitry 21, for example. The display 23 may display one of the following or may display a combination of two or more of the following: the projection images, the tomographic images, and the synthetic two-dimensional image.

Further, although the example was explained in the first embodiment in which the position of the breast B rendered in the first medical image is changed in accordance with the operation performed by the operator, the change may automatically be made without the operation of the operator. For example, the changing function 211 may change the position of the breast rendered in the first medical image, so that the positions of the breast are bilaterally symmetrical between the first medical image and a third medical image forming a left-and-right pair. In another example, the changing function 211 may change the position of the breast rendered in the first medical image so that a predetermined site of interest in common to the first medical image and the third medical image is displayed in a predetermined position.

In that situation, for example, the changing function 211 may change the position of the breast B rendered in the first medical image, so that the predetermined site of interest that is in common to the left and the right breasts B is to be arranged in the predetermined position. Examples of the site of interest in common include the nipples and the contour line of the breasts. The predetermined position may be the center of the image in terms of the up-and-down direction, or the like.

For instance, the changing function 214 changes the position of the left breast B so that, for example, the nipples are arranged at the center of the images in terms of the up-and-down direction, in the left-and-right pair formed by the two-dimensional image (the first medical image) rendering the left breast B and the two-dimensional image (the third medical image) rendering the right breast B. In this situation, on the basis of the position of the left breast B changed by the changing function 211, the correcting function 212 corrects the position of the left breast B rendered in the tomosynthesis image (the second medical image) kept in correspondence with the two-dimensional image. On such occasion, the changing function 211 may change not only in the two-dimensional image (the first medical image) rendering the left breast B, but also the position of the right breast B rendered in the two-dimensional image (the third medical image) that forms a left-and-right pair with the two-dimensional image, so that the correcting function 212 corrects the position of the right breast B rendered in the tomosynthesis image (a fourth medical image) taken in the same positional arrangement state as that in the two-dimensional image (the third medical image) rendering the right breast B. As a result, it is possible to change and correct the positions of the breast B rendered in the various types of medical images without operations of the operator.

Further, the first medical image and the second medical image may be breast images obtained by performing mutually the same type of imaging processes. In other words, although the example was explained in the first embodiment in which the two-dimensional images and the tomosynthesis images are obtained by performing the mutually-different types of imaging processes, the present disclosure is also applicable to images obtained by performing mutually the same type of imaging processes such as tomosynthesis imaging. More specifically, one of the first and the second medical images may be one selected from among: projection images obtained by performing tomosynthesis imaging; tomographic images obtained by reconstructing the projection images; and a synthetic two-dimensional image obtained by synthesizing the tomographic images. The other of the first and the second medical images may be a different one selected from among: the projection images, the tomographic images, and the synthetic two-dimensional image. For example, when the display 23 displays the tomographic images and the synthetic two-dimensional image based on the tomosynthesis imaging performed on the left breast B, the changing function 211 changes the position of the breast B while using one selected from between the tomographic images and the synthetic two-dimensional image as the first medical image. On the basis of the position of the breast B changed by the changing function 211, the correcting function 212 corrects the position of the breast B while using the other of the two as the second medical image. Alternatively, the first medical image and the second medical image may be determined from among mutually the same type of images. For example, the first medical image and the second medical image may be determined from among projection images or among tomographic images.

Second Embodiment

Figure 5:
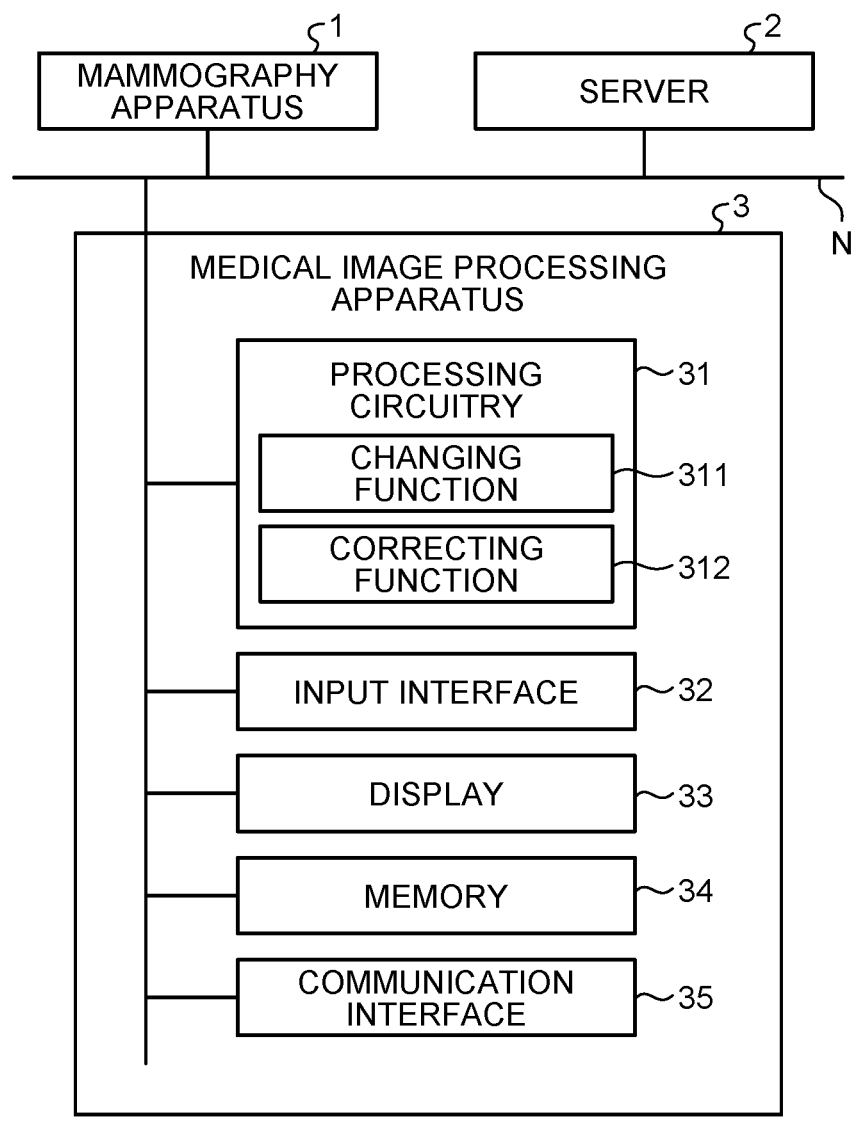
FIG. 5 is a block diagram illustrating a configuration of a medical image processing apparatus according to a second embodiment.

FIG. 5 is a block diagram illustrating an exemplary configuration of a medical image processing apparatus 3 according to a second embodiment. To be more specific, while the first embodiment used the example of the mammography apparatus, the second embodiment uses an example of the medical image processing apparatus 3. The medical image processing apparatus 3 is configured by using, for example, an information processing apparatus such as a viewer, a workstation, a tablet terminal, or the like. As illustrated in FIG. 5, the medical image processing apparatus 3 is communicably connected to the mammography apparatus 1 and a server 2 via a network N.

By using the medical image processing apparatus 3, an operator such as an image interpreting doctor performs image interpreting and editing processes on various types of medical images obtained from the mammography apparatus 1 and the server 2. The medical image processing apparatus 3 includes processing circuitry 31, an input interface 32, a display 33, a memory 34, and a communication interface 35. Because the processing circuitry 31, the input interface 32, the display 33, and the memory 34 are the same as the constituent elements of the mammography apparatus 1 described in the first embodiment, duplicate explanations thereof will be omitted.

The communication interface 35 is configured by using a communication device such as network card, a network adaptor, a Network Interface Controller (NIC), or the like. The communication interface 35 is configured to communicated with the mammography apparatus 1 and the server 2 connected via the network N, under control of the processing circuitry 31. The communication interface 35 is configured to receive various types of medical images from the mammography apparatus 1 and the server 2.

The processing circuitry 31 is configured to store the various types of medical images received by the communication interface 35, into the memory 34. Further, in accordance with an operation performed via the input interface 32 by the operator such as an image interpreting doctor, the processing circuitry 31 is configured to cause the display 33 to display any of the medical images stored in the memory 34. The operator interprets the medical images displayed on the display 33 and performs an editing process such as appending an annotation represented by text and/or a diagram to a site being a region of interest or the like rendered in the medical images. The processing circuitry 31 is configured to store the medical images resulting from the editing process, into the memory 34.

For example, as illustrated in FIG. 3, the processing circuitry 31 is configured to cause the display 33 to display the two-dimensional images and the tomosynthesis images (the four X-ray images) rendering the left and the right breasts B. When the placement positions of the breasts B on the mammography apparatus 1 are different between when the left breast B is imaged and when the right breast B is imaged, the left and the right breasts B are displayed while the positions thereof are not bilaterally symmetrical.

A changing function 311 included in the processing circuitry 31 is configured to change the position of the breast B in one (the first medical image) of the four X-ray images displayed on the display 33. The operator views the left and the right breasts B displayed on the display 33 and performs an operation to move a breast B so that the left and the right breasts B become bilaterally symmetrical. For example, as illustrated in the left section of FIG. 4, via the input interface 32, the operator performs a change operation to align the position of the left breast B with the position of the right breast B, within the two-dimensional image (the first medical image) rendering the left breast B and being displayed on the display 33. In this situation, in accordance with the change made to the position of the breast B, the changing function 311 corrects the position of the annotation attached to the two-dimensional image (the first medical image).

Figure 4:
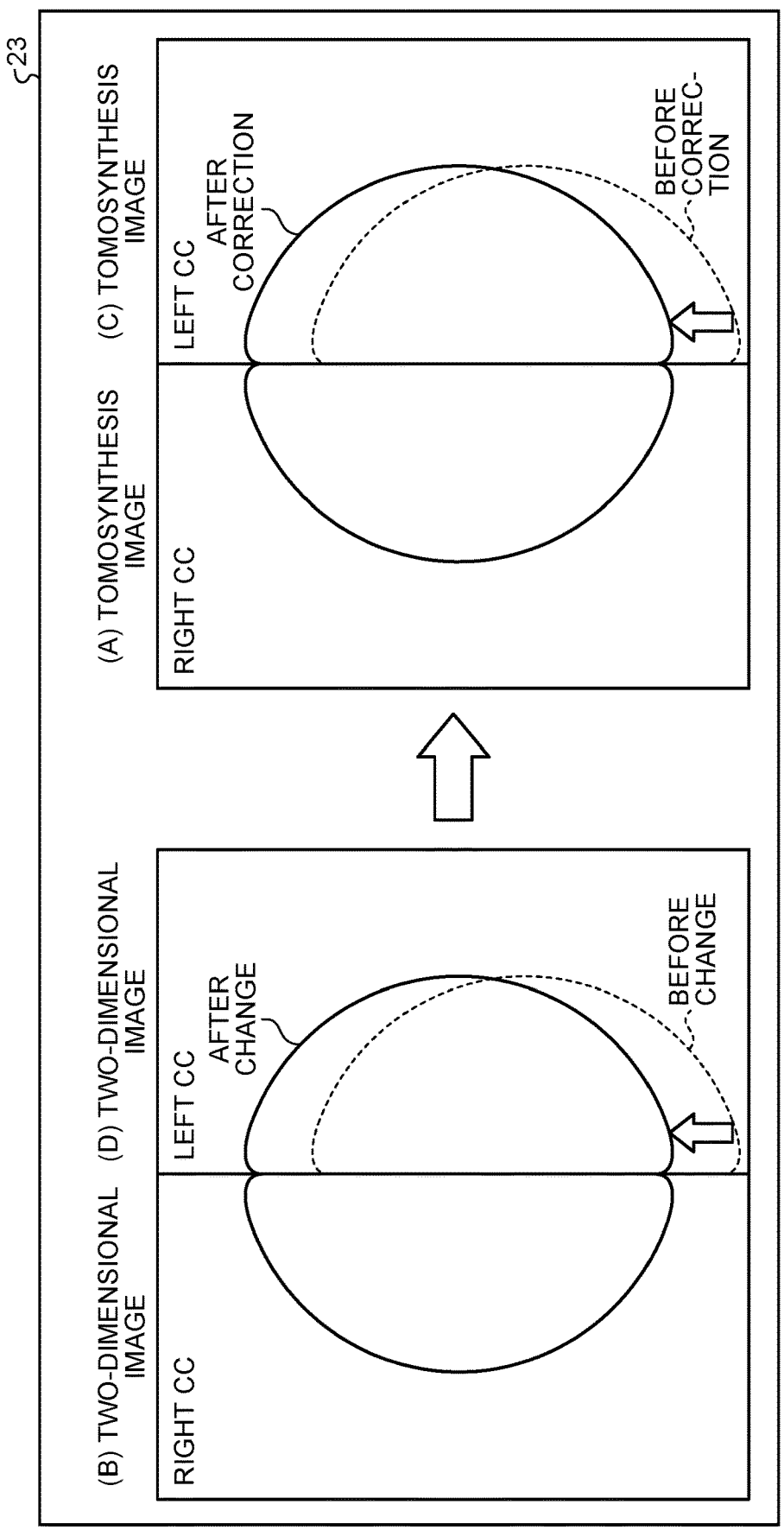
FIG. 4 is a drawing illustrating an example of a processing result obtained by the mammography apparatus illustrated in FIG. 1.

As illustrated in the right section of FIG. 4, A correcting function 312 included in the processing circuitry 31 is configured to correct the position of the left breast B rendered in the tomosynthesis image (the second medical image) kept in correspondence with the two-dimensional image, on the basis of the position of the breast B changed by the changing function 211. More specifically, the correcting function 312 is configured to obtain change information based on the change made to the position of the left breast B rendered in the two-dimensional image and to further correct the position of the left breast B rendered in the tomosynthesis image (the second medical image) on the basis of the change information.

Further, on the basis of the position of the breast B changed by the changing function 211, the correcting function 312 is configured to correct the position of the annotation attached to the tomosynthesis image (the second medical image). In other words, the correcting function 312 is configured to also correct the position of the annotation in accordance with the correction of the position of the breast B.

The changing function 311 is configured to store, into the memory 34, the first medical image (e.g., the two-dimensional image rendering the left breast B) in which the position of the breast B has been changed, the second medical image (e.g., the tomosynthesis image rendering the left breast B), the change information, and information about the post-change annotation, together with the pre-change X-ray images and information about the pre-change annotation.

Further, when an operation is performed by the operator to select a medical image that has been processed (i.e., after the position of the breast B was changed and corrected) by the changing function 311 and the correcting function 312, from among the various types of medical images stored in the memory 34, the processing circuitry 31 causes the display 33 to present a display so that the operator is able to select from between: a normal display mode in which the medical images before being processed (before the position of the breast B was changed and corrected) are displayed; and a comparison image interpretation mode in which the medical images after being processed are displayed. With this arrangement, the operator is able to view the medical images before and after the position of the breast B was corrected.

As explained above, according to the second embodiment, the changing function 311 is configured to change the position of the breast B rendered in the first medical image (e.g., the two-dimensional image) selected from between the two-dimensional image and the tomosynthesis image rendering the breast and being taken in mutually the same positional arrangement state. The correcting function 312 is configured to correct the position of the breast B rendered in the second medical image (e.g., the tomosynthesis image), on the basis of the position of the breast B changed by the changing function 311. Accordingly, by simply changing the position of the breast B in one of the two-dimensional and tomosynthesis images taken in mutually the same positional arrangement state, it is possible to correct the position of the breast B in the other image. Consequently, it is possible to easily correct the position of the breast B rendered in the medical image used in comparison.

Further, according to the second embodiment, the correcting function 312 is configured to correct the position of the annotation attached to the tomosynthesis image (the second medical image), on the basis of the position of the breast B changed by the changing function 311. Consequently, it is possible to appropriately correct the position of the annotation attached to the breast B rendered in the medical image used in comparison.

Other Embodiments

In the first and the second embodiments, the example of translating the breast B upward was explained as an example of changing the position of the breast B; however, possible embodiments are not limited to this example. For instance, the changing function 211 (or 311) may change the position of the breast B by translating, rotating, enlarging, or reducing the breast B in an arbitrary direction such as an up-and-down, a left-and-right, or a diagonal direction. In that situation also, the correcting function 212 (or 312) may be configured to correct the position of the breast B rendered in the second medical image in which the positional arrangement state of the breast is the same as that in the first medical image, on the basis of the position of the breast B changed in the first medical image by the changing function 211 (or 311).

In the X-ray diagnosis apparatus described in the embodiments, the processing functions are stored in the memory in the form of computer-executable programs. The processing circuitry is a processor configured to realize the functions corresponding to the programs, by reading and executing the programs from the memory. In other words, the processing circuitry that has read the programs has the functions corresponding to the read programs. Further, although the example was explained in the above embodiments in which the processing functions are realized by the single processing circuit, possible embodiments are not limited to this example. For instance, the processing circuitry may be structured by combining together a plurality of independent processors, so that the processing functions are realized as a result of the processors executing the programs. Further, the processing functions of the processing circuit may be realized as being distributed among or integrated into one or more processing circuits, as appropriate.

The term "processor" used in the above explanations denotes, for example, a Central Processing Unit (CPU), a Graphics Processing Unit (GPU), or a circuit such as an Application Specific Integrated Circuit (ASIC) or a programmable logic device (e.g., a Simple Programmable Logic Device [SPLD], a Complex Programmable Logic Device [CPLD], or a Field Programmable Gate Array [FPGA]). The one or more processors are configured to realize the functions by reading and executing the programs saved in a storage 111.

Further, in the above embodiments, the example was explained in which the memory has stored therein the programs corresponding to the processing functions; however, it is also acceptable to provide a plurality of memories in a distributed manner, so that the processing circuit reads a corresponding program from each of the individual memories. Further, instead of saving the programs in the one or more memories, it is also acceptable to directly incorporate the programs into the circuits of one or more processors. In that situation, the one or more processors realize the functions by reading and executing the programs incorporated in the circuits thereof.

The constituent elements of the apparatuses and devices in the above embodiments are based on functional concepts. Thus, it is not necessarily required to physically configure the constituent elements as indicated in the drawings. In other words, specific modes of distribution and integration of the apparatuses and devices are not limited to those illustrated in the drawings. It is acceptable to functionally or physically distribute or integrate all or a part of the apparatuses and devices in any arbitrary units, depending on various loads and the status of use. Further, all or an arbitrary part of the processing functions performed by the apparatuses and devices may be realized by a CPU and a program analyzed and executed by the CPU or may be realized as hardware using wired logic.

Further, it is possible to realize the controlling methods explained in the above embodiments, by causing a computer such as a personal computer or a workstation to execute a controlling program prepared in advance. The controlling program may be distributed via a network such as the Internet. Further, the controlling program may be executed, as being recorded on a non-transitory computer-readable recording medium such as a hard disk, a flexible disk (FD), a Compact Disk Read-Only Memory (CD-ROM), a Magneto Optical (MO) disk, a Digital Versatile Disk (DVD), or the like and being read by a computer from the recording medium.

According to at least one aspect of the embodiments described above, it is possible to easily correct the position of the breast rendered in the medical image used in comparison.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. A medical image processing apparatus comprising:
processing circuitry configured to
cause a first medical image taken of one of left or right breasts and a third medical image taken of the other breast to be displayed side by side in a display area for displaying side by side medical images of left and right breasts;

receive an operation to change a displayed position of a breast rendered in the first medical image from an operator, and obtain change information based on the change made to the displayed position of the breast rendered in the first medical image;

when the operation is received, cause, on a basis of the change information, the first medical image after changing the displayed position of the breast and the third medical image to be displayed side by side in the display area; and when images in the display area are switched from a first image group including the first medical image and the third medical image to a second image group including a second medical image and a fourth medical image, the second image group having an image type different from the first image group, correct a displayed position of the breast rendered in the second medical image by changing the displayed position of the breast rendered in the second medical image using a change direction and a change amount corresponding to the change information of the first medical image, and cause the second medical image after changing a displayed position of the breast rendered in the second medical image and the fourth medical image to be displayed side by side in the display area, the second medical image being an image taken of the same breast as in the first medical image in the same positional arrangement state, the fourth medical image being an image taken of the same breast as in the third medical image in the same positional arrangement state, wherein one of the first image group including the first medical image and the third medical image and the second image group including the second medical image and the fourth medical image is a two-dimensional image obtained by performing a mammography imaging process, whereas the other of the first image group and the second image group is a tomographic image obtained by reconstructing a projection image obtained by performing a tomosynthesis imaging process.

2. The medical image processing apparatus according to claim 1, wherein
the processing circuitry is configured to
change the displayed position of the breast rendered in the second medical image in a same direction as the change direction in the change information and by a same amount as the change amount in the change information.

3. The medical image processing apparatus according to claim 1, wherein the processing circuitry is configured to change the displayed position of the breast rendered in the first medical image, so that positions of the breast are bilaterally symmetrical between the first medical image and the third medical image forming a left-and-right pair.

4. The medical image processing apparatus according to claim 3, wherein the processing circuitry is configured to change the displayed position of the breast rendered in the first medical image, so that a predetermined site of interest in common to the first medical image and the third medical image is displayed in a predetermined position.

5. The medical image processing apparatus according to claim 1, wherein the processing circuitry is configured to change the displayed position of the breast rendered in the first medical image in accordance with an operation performed by an operator.

6. The medical image processing apparatus according to claim 1, wherein
one or both of the first and the second medical images has appended thereto positional arrangement identification information identifying images taken of the breast in a mutually same positional arrangement state, and
on a basis of the positional arrangement identification information, the processing circuitry is configured to identify the second medical image in which the positional arrangement state of the breast is the same as that in the first medical image and further correct the displayed position of the breast rendered in the second medical image.

7. The medical image processing apparatus according to claim 1, wherein, on a basis of the post-change displayed position of the breast, the processing circuitry is configured to correct a position of an annotation attached to the second medical image.

8. The medical image processing apparatus according to claim 1, wherein when the second medical image and the fourth medical image are displayed side by side in the display area, the processing circuitry is configured to adjust the displayed position of the breast rendered in the second medical image to the post-change displayed position of the breast rendered in the first medical image.

9. The medical image processing apparatus according to claim 1, wherein the first medical image and the second medical image are images taken from a start of compression of one of the left and right breasts by a compression plate until an end of compression, the third medical image and the fourth medical image are images taken from a start of compression of the other of the left and right breasts by the compression plate until an end of compression.

10. The medical image processing apparatus according to claim 1, wherein the processing circuitry is configured to cause a display to display the first medical image and the third medical image side by side, and to display the second medical image in which the displayed position of the breast has been corrected and the fourth medical image side by side in response to an operation performed by an operator.

11. A mammography apparatus comprising:
processing circuitry configured to
perform control for imaging a breast;
cause a first medical image taken of one of left or right breasts and a third medical image taken of the other breast to be displayed side by side in a display area for displaying side by side medical images of left and right breasts;
receive an operation to change a displayed position of a breast rendered in the first medical image from an operator, and obtain change information based on the change made to the displayed position of the breast rendered in the first medical image;
when the operation is received, cause, on a basis of the change information, the first medical image after changing the displayed position of the breast and the third medical image to be displayed side by side in the display area; and
when images in the display area are switched from a first image group including the first medical image and the third medical image to a second image group including a second medical image and a fourth medical image, the second image group having an image type different from the first image group, correct a displayed position of the breast rendered in the second medical image by changing the displayed position of the breast rendered in the second medical image using a change direction and a change amount corresponding to the change information of the first medical image, and cause the second medical image after changing a displayed position of the breast rendered in the second medical image and the fourth medical image to be displayed side by side in the display area, the second medical image being an image taken of the same breast as in the first medical image in the same positional arrangement state, the fourth medical image being an image taken of the same breast as in the third medical image in the same positional arrangement state, wherein one of the first image group including the first medical image and the third medical image and the second image group including the second medical image and the fourth medical image is a two-dimensional image obtained by performing a mammography imaging process, whereas the other of the first image group and the second image group is a tomographic image obtained by reconstructing a projection image obtained by performing a tomosynthesis imaging process.

12. A medical image processing method comprising:

causing a first medical image taken of one of left or right breasts and a third medical image taken of the other breast to be displayed side by side in a display area for displaying side by side medical images of left and right breasts;

receiving an operation to change a displayed position of a breast rendered in the first medical image from an operator, and obtaining change information based on the change made to the displayed position of the breast rendered in the first medical image;

when the operation is received, causing, on a basis of the change information, the first medical image after changing the displayed position of the breast and the third medical image to be displayed side by side in the display area; and when images in the display area are switched from a first image group including the first medical image and the third medical image to a second image group including a second medical image and a fourth medical image, the second image group having an image type different from the first image group, correcting a displayed position of the breast rendered in the second medical image by changing the displayed position of the breast rendered in the second medical image using a change direction and a change amount corresponding to the change information of the first medical image, and causing the second medical image after changing a displayed position of the breast rendered in the second medical image and the fourth medical image to be displayed side by side in the display area, the second medical image being an image taken of the same breast as in the first medical image in the same positional arrangement state, the fourth medical image being an image taken of the same breast as in the third medical image in the same positional arrangement state, wherein one of the first image group including the first medical image and the third medical image and the second image group including the second medical image and the fourth medical image is a two-dimensional image obtained by performing a mammography imaging process, whereas the other of the first image group and the second image group is a tomographic image obtained by reconstructing a projection image obtained by performing a tomosynthesis imaging process.

* * * * *